July 21, 1925.

H. C. CROMWELL ET AL 1,546,568

RAILWAY CAR TRUCK

Filed July 10, 1923  3 Sheets-Sheet 1

Inventor
Harry C. Cromwell
Oscar V. Barup
Paul W. Day
By John W. Harley
Attorney July 21, 1925.

H. C. CROMWELL ET AL 1,546,568

RAILWAY CAR TRUCK

Filed July 10, 1923   3 Sheets-Sheet 2

Inventor
Harry C. Cromwell
Oscar V. Borup
Paul W. Day

By John W. Darley
Attorney

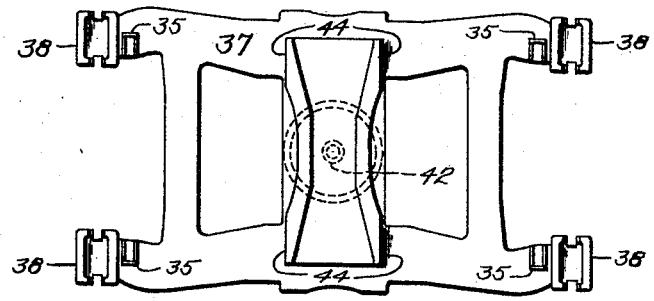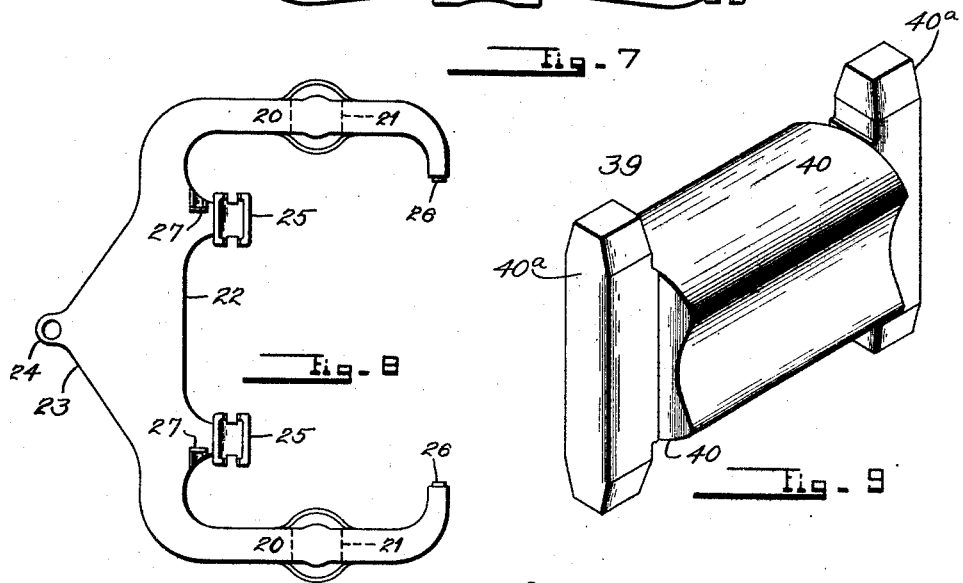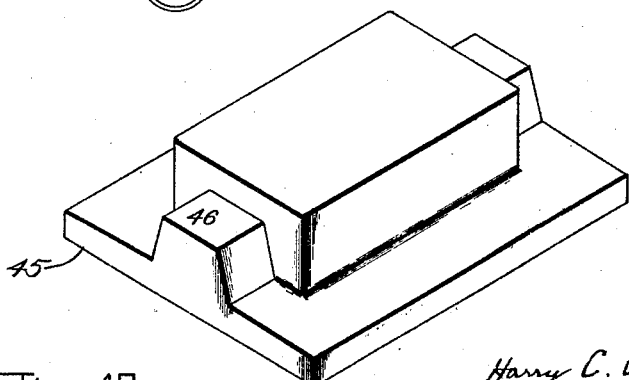

Patented July 21, 1925.

1,546,568

UNITED STATES PATENT OFFICE.

HARRY C. CROMWELL AND PAUL W. DAY, OF BALTIMORE, AND OSCAR V. BORUP, OF CATONSVILLE, MARYLAND, ASSIGNORS, BY MESNE ASSIGNMENTS, TO HERBERT M. BRUNE, CHARLES E. SCARLETT, AND JANON FISHER, TRUSTEES, ALL OF BALTIMORE, MARYLAND.

RAILWAY-CAR TRUCK.

Application filed July 10, 1923. Serial No. 650,644.

*To all whom it may concern:*

Be it known that we, HARRY C. CROMWELL, PAUL W. DAY, and OSCAR V. BORUP, citizens of the United States, residing, respectively, at Baltimore, Baltimore, and Catonsville, in the State of Maryland, have invented certain new and useful Improvements in Railway-Car Trucks; and we do hereby declare the following to be a full, clear, and exact description of the invention, such as will enable others skilled in the art to which it appertains to make and use the same.

Our invention relates to railway car trucks.

Our improved truck comprises six wheels mounted upon three axles and each axle is revolubly mounted in a member. The pilot and trailer members are connected to the central member by what is substantially a ball and socket joint so that each member may move vertically and transversely horizontally without producing a corresponding movement of either or both of the other members.

Means are also provided for producing a horizontal coordinating action of the wheels and journals so that the wheels will conform to the contour of the rails whatever it may be and so that the angular position of the central axle will be co-ordinated to the position of either or both the pilot and trailer axles.

The horizontal coordinating action involved in our improved truck is clearly illustrated and explained and the method and means by which said action is effectuated is set forth in U. S. Letters Patent #1,341,776 issued June 1, 1920.

In combination with the horizontal coordinating action just referred to, our improved truck involves equalized vertical actions of the several members of the truck, and the method of accomplishing the horizontal coordinating action of truck members in combination with an equalized vertical action thereof is set forth in U. S. Letters Patent #1,341,777 issued June 1, 1920. In the last-named Letters Patent there is also set forth one means for effecting the horizontal coordinating action of the several members in combination with an equalized vertical action thereof.

Among the objects of our invention are:—

To simplify the various members of the truck.

To produce a truck the members of which can be assembled or separated without the use of tools.

To produce a truck having a member which acts to coordinate the mutual angularity of the axles in a horizontal plane and at the same time serves to transmit the load stresses to the end members through a friction reducing element.

To produce a truck having a member which acts to coordinate the mutual angularity of the axles in a horizontal plane and at the same time serves to transmit the vertical load stresses to the end members in such position that said stresses always act in such locations as to produce a pressure of the wheels of the end members upon the rails.

To provide means for connecting the pilot and trailer bolsters to the central bolster so that the former may have horizontal and vertical freedom with reference to the latter while at the same time they transmit to the central bolster a proportionate part of the vertical load stresses.

One example of our improved truck is shown in the accompanying drawing for purposes of illustration.

In carrying out our invention we make use of the instrumentalities illustrated in the accompanying drawings, in which:—

Fig. 7 is a view of the coordinating plate looking in the direction of the arrow 7 in Fig. 2.

Fig. 8 is a view of either the pilot or trailer bolsters when viewed in the direction of the arrow 8 in Fig. 2.

Fig. 9 is a perspective view of the friction reducing element shown in Figs. 3 and 4.

Fig. 10 is a perspective view of one member of the friction reducing element shown in Figs. 5 and 6.

In the drawings:—

Figure 1:
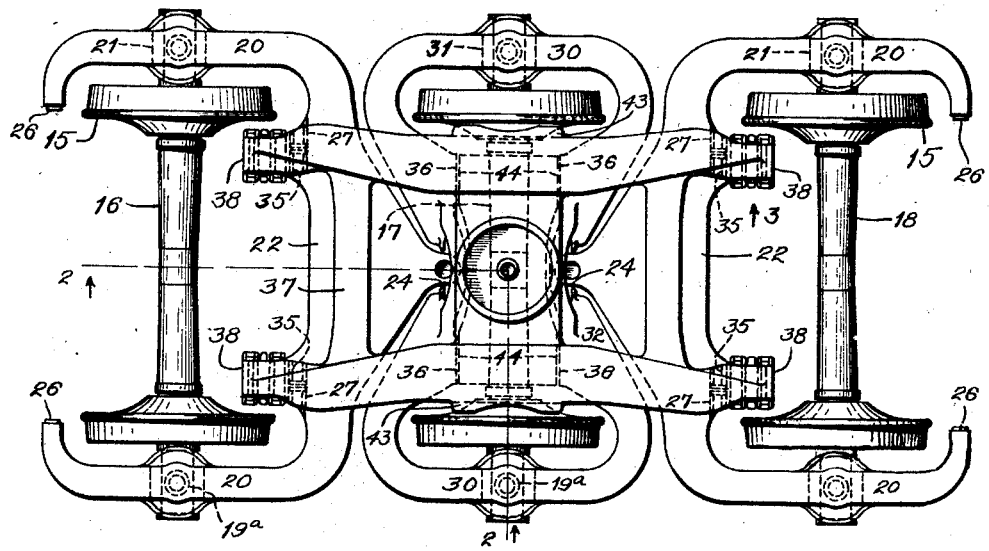
Figure 1 is a plan view of a six wheel car truck constructed according to our invention.
Figure 2:
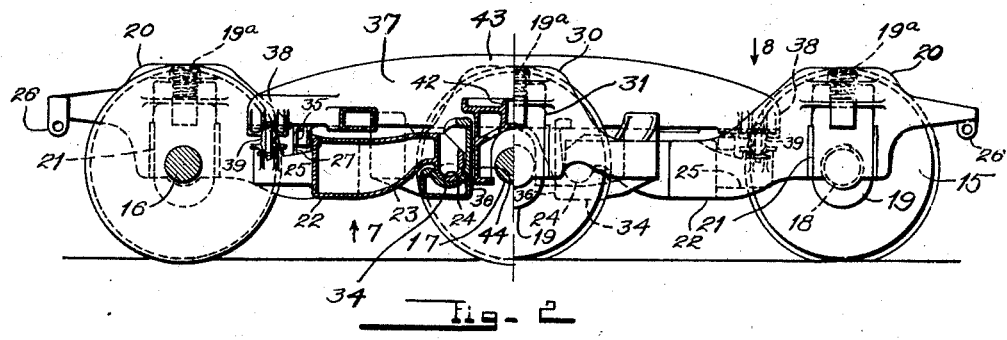
Fig. 2 is a section along the lines 2—2 looking in the direction of the arrows.

15 represents the wheels and 16, 17 and 18 represent, respectively, the pilot, central and trailer axles. The journals of the axles are mounted in any approved form of axle box, such as 19 and the axles and wheels are of Master Car Builders construction. Each pilot and trailer bolster consists of a pair of pedestals such as 20, each pedestal being provided with a recess having jaws 21 for the reception of the axle box 19 which slides freely therein, and springs 19a are placed between each axle box and the top of the corresponding recess. The pedestals 20—20 of each end member are joined together by a frame 22 and said frame is provided with an extension 23 terminating in the boss 24 having a hemispherical lower surface.

The frame 22 is provided with two bases 25—25 for the support of the friction reducing elements and with ears 26—26 for the support of brake shoes. The brake shoes forming no part of our present invention are not illustrated or described.

The frame 22 is provided with a pair of rocker bearings 27—27 for a purpose hereinafter explained.

The central bolster consists of a pair of pedestals such as 30—30 each pedestal being provided with a recess having jaws 31 for the reception of the axle box 19 which slides freely therein, and springs 19a are placed between each axle box and the top of the corresponding recess.

The pedestals 30—30 of the central bolster are joined together by the frame 32 and said frame may be provided with ears for the support of brake shoes.

The frame 32 is provided on each side with a pair of sockets 34—34 having hemispherical bottoms; one of the bosses 24 is introduced in each of the sockets 34 and serves to connect the corresponding pilot and trailer bolster with the central bolster.

The frame 32 is provided with four finished surfaces 36 for a purpose hereinafter explained.

It is to be noted that by reason of the shape of the boss 24 and the socket 34 the pilot and trailer bolsters, in addition to revolving in a horizontal plane around the axis of said socket, can move vertically and also angularly in vertical planes. Thus, each of the pilot and trailer bolsters is articulated with the central bolster by a universal joint.

The coordinating plate 37 is provided with four bearings 35 which contact with the rocker bearings 27 for a purpose hereinafter explained.

The bearings 35 are formed upon the arms 38 of the coordinating plate 37 which also extend over the friction reducing element 39.

The friction reducing element 39 is provided with curved surfaces 40—40 at the bottom and top thereof. The surface at the bottom of each element rests upon a base 25 and the corresponding arm 38 rests upon the top surface. Each element 39 is provided with stops 40a on the ends thereof, the latter extending over the sides of the base 25 and the arm 38 to prevent undue endwise movement of said element with reference to said base and arm.

In order to prevent undue angular displacement of the element 39 with reference to the base 25 and the arm 38, the stops 40a extend between the flanges 41—41 formed on each side of said base, and flanges 41a—41a formed on each side of said arm.

The center plate 42 is connected to the car body in any approved manner and any approved form of side bearings are to be secured upon said body to form a sliding bearing upon the truck side bearings 43.

The coordinating plate 37 is provided with four gibs 44 finished on the outer surface thereof which project downwardly and each has a sliding bearing upon one of the finished surfaces 36 of the frame 32, thus connecting the coordinating plate and the central bolster together in such a manner that while the former can have angular movements in a vertical plane and vertical and transverse movements with reference to the latter, yet the latter is forced to partake of the angular movement in a horizontal plane of the former.

Each of the bearings 35 of the coordinating plate 37 may have vertical and longitudinal movements as well as angular movements within the corresponding rocker bearings 27.

The truck bolsters act coordinately horizontally according to the method set forth in U. S. Letters Patent #1,341,776 with the exception that each pilot and trailer bolster is joined by a ball and socket joint to the second bolster on the near side thereof. This construction has been adopted in the truck shown in the present application in order to provide for a different relative angular movement of said bolsters from the movement of the bolsters shown in the patent just referred to.

Movements of the pilot, trailer and central bolsters with reference to the coordinating plate which are permitted by the ball and socket joints connecting the pilot and trailer bolsters to the central bolster insure the utmost freedom of the wheels in following the vertical contour of the rails. As set forth in U. S. Letters Patent #1,341,776 the horizontal coordinating movements of the members provide for the utmost freedom of the wheels in following the horizontal contour of the track. Thus, the truck illustrated and described herein provides for the minimization of the friction due to the vertical and transverse stresses against the rails and thus insures a minimization of the longitudinal stress against the draw bar of the locomotive and thus reduces the operating cost as well as the cost of upkeep of rails and trucks.

It is to be noted that the vertical stresses from the car body and load are applied to the coordinating plate 37 upon the center plate 42 and these stresses are then distributed to the arms 38, from said arms through the friction reducing element 39 to the bases 25; from the bases 25 portions of the stresses are delivered to the pilot and trailer wheels and other portions are delivered to the central wheels through the ball and socket joints connecting the pilot and trailer bolsters to the central bolster. The various parts concerned in the distribution of these portions of the total load stress are so located that the vertical load stresses upon the wheels are approximately equal.

It is to be noted that as either the pilot or trailer bolster moves transversely with respect to the central bolster it turns about its ball and socket joint and by means of the bearings 27 it moves the corresponding end of the coordinating plate 37 about an axis substantially midway between the bearings 35 at the other end of said coordinating plate.

The angular movements of the pilot or trailer bolster being about pivotal points that are not coaxial, it is evident that a sliding shifting movement takes place between the rocker bearings 27 and the bearings 35. It is the function of the friction reducing element 39 to permit of the free movement of the coordinating plate relative to either the pilot or trailer bolster.

Figure 3:
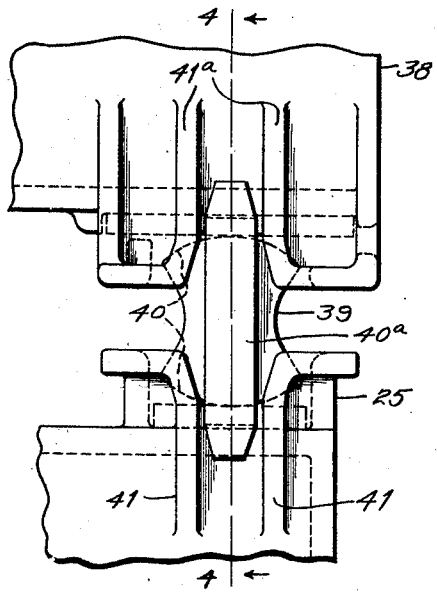
Fig. 3 is an enlarged side view of one of the friction reducing elements used in our improved truck when viewed in the direction of the arrow 3 in Fig. 1.
Figure 4:
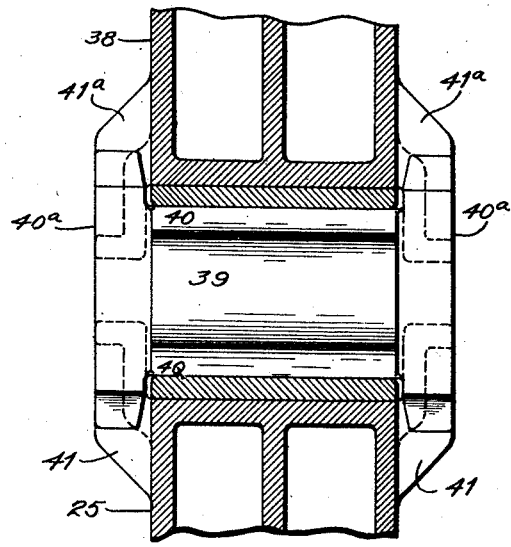
Fig. 4 is a view of the friction reducing element shown in Fig. 3, portions of the truck which cooperate with said element being shown in section along the line 4—4 in Fig. 3 looking in the direction of the arrows.
Figure 5:
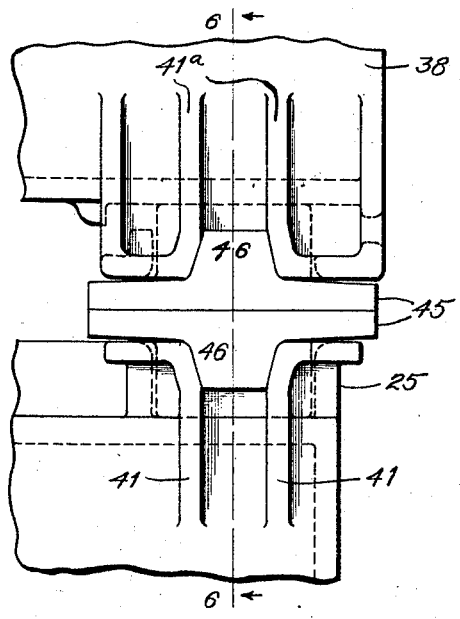
Fig. 5 is a view similar to Fig. 3 but showing an alternative form of friction reducing element that may be used in our improved truck.
Figure 6:
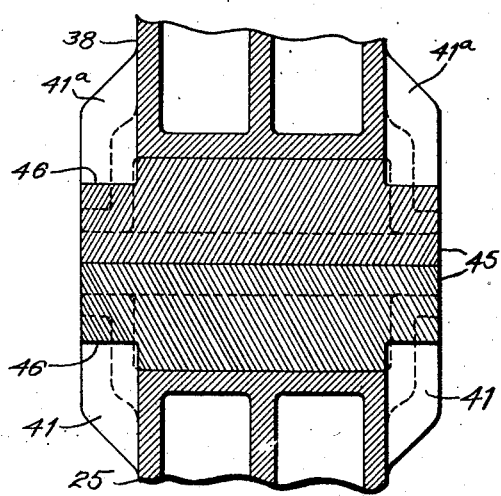
Fig. 6 is a view of the friction reducing element in Fig. 5, the portions of the truck which cooperate with said element being shown in section along the line 6—6 in Fig. 5 looking in the directions of the arrows.

For certain classes of work the friction reducing element shown in Figs. 3 and 4 is replaced by the element shown in Figs. 5 and 6 which consists of flat plates 45—45 each provided with a rib 46, the rib on the lower plate 45 extending between the flanges 41—41 formed on the base 25 and the rib 46 on the upper plate 45 extending between the flanges 41ª—41ª formed on the arm 38.

The plates 45 shown in Figs. 5 and 6 may be formed of the same or of different materials, but they are preferably formed of such materials as will insure a low coefficient of friction between the contacting surfaces of said plates.

It is to be noted that if wear upon the elements 39 or the plates 45 occurs, new elements or plates can be inserted in lieu of the ones worn at a minimum cost.

While we have shown one preferred form of our improved truck for illustrating our invention, it is to be understood that the invention is not to be considered as limited to the structures as shown, for changes may be made therein without departing from the spirit of our invention.

We claim:—

1. In a six wheel truck, the combination with a bolster for each pair of journals, a coordinating plate engaging with the central bolster and with each of the pilot and trailer bolsters to control the mutual angularity of said journals, friction reducing elements between said coordinating plate and said pilot and trailer bolsters and a ball and socket joint between each of said pilot and trailer bolsters and said central bolsters.

2. In a six wheel truck, the combination with a bolster for each pair of journals, a coordinating plate engaging with the central bolster and with each of the pilot and trailer bolsters to control the mutual angularity of said journals, rocking friction reducing elements between said coordinating plate and said pilot and trailer bolsters and a ball and socket joint between each of said pilot and trailer bolsters and said central bolsters.

3. In a six wheel truck, the combination with a bolster for each pair of journals, a coordinating plate engaging with the central bolster and with each of the pilot and trailer bolsters to control the mutual angularity of said journals, said pilot and trailer bolsters comprising bases, friction reducing elements mounted on said bases, said coordinating plate comprising arms supported by said elements, and a ball and socket joint between each of said pilot and trailer bolsters and said central bolsters.

4. In a six wheel truck for railway cars, the combination with a bolster for each pair of journals, a coordinating plate comprising side bearings for the car body engaging with the central bolster and with each of the pilot and trailer bolsters to control the mutual angularity of said journals, friction reducing elements between said coordinating plate and said pilot and trailer bolsters and a ball and socket joint between each of said pilot and trailer bolsters and said central bolsters.

5. In a six wheel truck for railway cars, the combination with a bolster for each pair of journals, a coordinating plate comprising a center plate and side bearings for the car body engaging with the central bolster and with each of the pilot and trailer bolsters to control the mutual angularity of said journals, friction reducing elements between said coordinating plate and said pilot and trailer bolsters and a ball and socket joint between each of said pilot and trailer bolsters and said central bolsters.

6. In a six wheel truck, the combination with a bolster for each pair of journals, a coordinating plate engaging with the central bolster and with each of the pilot and trailer bolsters to control the mutual angularity of said journals, said pilot and trailer bolsters each comprising bases and spaced apart flanges adjacent each of said bases; said coordinating plate comprising an arm extending over each of said bases and spaced apart flanges adjacent each of said arms, a friction reducing element mounted between each base and the corresponding arm and comprising stops extending between said flanges and a ball and socket joint between each of said pilot and trailer bolsters and said central bolster.

7. In a six wheel truck for railway cars, the combination with a bolster for each pair of journals comprising pedestals, journal boxes slidably mounted in said pedestals, springs between said pedestals and boxes, a coordinating plate engaging with the central bolster and with each of the pilot and trailer bolsters to control the mutual angularity of said journals, friction reducing elements between said coordinating plate and said pilot and trailer bolsters, a ball and socket joint between each of said pilot and trailer bolsters and said central bolsters and means on said coordinating plate for supporting the car body.

8. In a six wheel truck, the combination with a bolster for each pair of journals, a coordinating plate engaging with the central bolster and with each of the pilot and trailer bolsters to control the mutual angularity of said journals, said pilot and trailer bolsters comprising bases located between the flanges of the wheels, friction reducing elements mounted on said bases, said coordinating plate comprising arms supported by said elements, and a ball and socket joint between each of said pilot and trailer bolsters and said central bolsters.

9. In a six wheel truck having pilot, trailer and central bolsters each comprising pedestals, the combination with a rigid structure subjected to the vertical load stress, of a flexible connection between said pilot and trailer bolsters and said central bolster, journal boxes slidably mounted in said pedestals, springs between said pedestals and boxes and friction reducing elements between said structure and said pilot and trailer bolsters for transmitting said stress from said structure to said pilot and trailer bolsters.

10. In a six wheel truck having pilot, trailer and central bolsters each comprising pedestals, the combination with a rigid structure subjected to the vertical load stress and engaging said bolsters to coordinate the mutual angularity of the axles, of a flexible connection between said pilot and trailer bolsters and said central bolster, journal boxes slidably mounted in said pedestals, springs between said pedestals and boxes and friction reducing elements between said structure and said pilot and trailer bolsters for transmitting said stress from said structure to said pilot and trailer bolsters.

11. In a six wheel truck, the combination with a bolster for each pair of journals, of a coordinating plate engaging with the central bolster, rocker bearings on the pilot and trailer bolsters, and bearings on said coordinating plate engaging said rocker bearings.

12. In a six wheel truck, the combination with a bolster for each pair of journals, of a coordinating plate engaging with the central bolster, rocker bearings on the pilot and trailer bolsters, bearings on said coordinating plate engaging said rocker bearings, and friction reducing elements between said coordinating plate and said pilot and trailer bolsters adjacent said bearings.

In testimony whereof, we affix our signatures.

HARRY C. CROMWELL.
PAUL W. DAY.
OSCAR V. BORUP.